(12) United States Patent
Tanaka et al.

(10) Patent No.: US 8,501,315 B2
(45) Date of Patent: *Aug. 6, 2013

(54) HIGH-GLOSS PRESSURE-SENSITIVE ADHESIVE SHEET

(75) Inventors: Atsuhiro Tanaka, Tokyo (JP); Yoshitomo Ono, Tokyo (JP); Atsushi Tezuna, Tokyo (JP)

(73) Assignee: Lintec Corporation, Tokyo (JP)

(*) Notice: Subject to any disclaimer, the term of this patent is extended or adjusted under 35 U.S.C. 154(b) by 1037 days.

This patent is subject to a terminal disclaimer.

(21) Appl. No.: 11/727,644

(22) Filed: Mar. 27, 2007

(65) Prior Publication Data

US 2007/0231569 A1 Oct. 4, 2007

(30) Foreign Application Priority Data

Mar. 30, 2006 (JP) ................ 2006-095739

(51) Int. Cl.
 *B32B 7/12* (2006.01)
(52) U.S. Cl.
 USPC .................... 428/343; 428/355; 428/354
(58) Field of Classification Search
 USPC .................................. 428/343, 354
 See application file for complete search history.

(56) References Cited

U.S. PATENT DOCUMENTS

| 5,380,572 A * | 1/1995 | Kotani et al. ............ 428/41.3 |
| 7,041,195 B2 * | 5/2006 | McLeod et al. ............ 156/324 |
| 2007/0148468 A1 * | 6/2007 | Tanaka et al. ............ 428/411.1 |

FOREIGN PATENT DOCUMENTS

| JP | A-H06-080091 | 3/1994 |
| JP | B2-H07-074322 | 8/1995 |
| JP | A-H8-118531 | 5/1996 |
| JP | A-H10-052894 | 2/1998 |
| JP | A-H11-106713 | 4/1999 |
| JP | 2002-235052 | * 8/2002 |
| JP | A-2007-269927 | 10/2007 |
| WO | WO 2004/113464 | * 12/2004 |

OTHER PUBLICATIONS

Machine Translation of JP2002-235052, Kurabara, Akifumi, Aug. 2002.*
Burkhardt et al., Plastic processing, Jun. 15, 2000,Wiley-VCH GmbH &Co. KGaA.*
Office Action mailed Dec. 21, 2011 in corresponding JP application No. 2006-095739.

* cited by examiner

*Primary Examiner* — Callie Shosho
*Assistant Examiner* — Samir Shah
(74) *Attorney, Agent, or Firm* — Posz Law Group, PLC

(57) ABSTRACT

The present invention provides a high-gloss pressure-sensitive adhesive sheet according to which, even if a surface thereof becomes uneven due to grit or the like, the evenness can be recovered. In a pressure-sensitive adhesive sheet 1A comprising a substrate film 2A having a specular gloss Gs (60°) of not less than 80% and a pressure-sensitive adhesive layer 3, the substrate film 2A is made to have a storage modulus at some temperature between 70° C. and 90° C. in a range of from $1.0 \times 10^1$ to $2.8 \times 10^2$ MPa, and is preferably made to have a storage modulus at from 5 to 35° C. in a range of from $1.0 \times 10^2$ to $5.0 \times 10^3$ MPa.

4 Claims, 1 Drawing Sheet

HIGH-GLOSS PRESSURE-SENSITIVE ADHESIVE SHEET

BACKGROUND OF THE INVENTION

1. Field of the Invention

The present invention relates to a high-gloss pressure-sensitive adhesive sheet used predominantly outdoors.

2. Description of the Related Art

In recent years, as an alternative to paint, it has become common to use a pressure-sensitive adhesive sheet in which a pressure-sensitive adhesive is laminated on one surface of a thermoplastic transparent film or colored film, or such a film that has been printed (Japanese Patent Application Laid-open No. 10-52894, Japanese Patent Application Laid-open No. 11-106713, Japanese Patent Application Laid-open No. 6-80091).

Such a pressure-sensitive adhesive sheet may be planned to be stuck onto a signboard or molded article outdoors, or an automobile door sash or the like. However, the surface of a pressure-sensitive adhesive sheet used outdoors in this way often becomes uneven due to attachment or embedment of grit or the like. With a matt pressure-sensitive adhesive sheet having a rough surface, such unevenness is not conspicuous, but with a pressure-sensitive adhesive sheet having a high surface glossiness, such unevenness is conspicuous, being a problem in terms of appearance.

For paint, there has been proposed a self-recovering paint able to recover from surface unevenness (Japanese Patent Publication No. 7-74322). However, there is no known pressure-sensitive adhesive sheet that is self-recovering in this way.

SUMMARY OF THE INVENTION

The present invention has been devised in view of the above state of affairs; it is an object of the present invention to provide a high-gloss pressure-sensitive adhesive sheet according to which, even if a surface thereof becomes uneven due to grit or the like, the evenness can be recovered.

To attain the above object, the present invention provides a pressure-sensitive adhesive sheet comprising a single-layer substrate film and a pressure-sensitive adhesive layer, the substrate film having a specular gloss Gs (60°) of not less than 80%, wherein the substrate film has a storage modulus at some temperature between 70° C. and 90° C. in a range of from $1.0\times10^1$ to $2.8\times10^2$ MPa (invention 1). Note that in the present specification, "sheet" is deemed to include the idea of a film, and "film" is deemed to include the idea of a sheet.

According to the above invention (invention 1), due to the substrate film having a storage modulus as above, even if the surface of the substrate film happens to become uneven due to attachment or embedment of fine particles such as grit (yellow sand etc.), sand-mud, iron powder, exhaust soot or the like, by heating to a temperature within the above temperature range at which the storage modulus is as above, the substrate film will become soft, and hence the uneven surface of the substrate film can be recovered to its original even state, attached or embedded fine particles falling off from the substrate film. The high glossiness and good appearance can thus be recovered.

In the case of the above invention (invention 1), the substrate film preferably has a storage modulus at from 5 to 35° C. in a range of from $1.0\times10^2$ to $5.0\times10^3$ MPa (invention 2). Due to the substrate film having such a storage modulus, the pressure-sensitive adhesive sheet has particularly good sticking suitability under a temperature when stuck on under ordinary conditions.

In the case of the above inventions (inventions 1 and 2), the substrate film preferably comprises a polyurethane as a main component thereof (invention 3).

Secondly, the present invention provides a pressure-sensitive adhesive sheet comprising a multi-layer substrate film and a pressure-sensitive adhesive layer, a surface-most layer of the substrate film having a specular gloss Gs (60°) of not less than 80%, wherein the surface-most layer of the substrate film has a storage modulus at some temperature between 70° C. and 90° C. in a range of from $1.0\times10^1$ to $2.8\times10^2$ MPa (invention 4).

According to the above invention (invention 4), due to the surface-most layer of the substrate film having such a storage modulus, even if the surface of the substrate film happens to become uneven due to attachment or embedment of fine particles such as grit (yellow sand etc.), sand-mud, iron powder, exhaust soot or the like, by heating to a temperature within the above temperature range at which the storage modulus is as above, the surface-most layer of the substrate film will become soft, and hence the uneven surface of the substrate film can be recovered to its original even state, attached or embedded fine particles falling off from the substrate film. The high glossiness and good appearance can thus be recovered.

In the case of the above invention (invention 4), the substrate film overall preferably has a storage modulus at from 5 to 35° C. in a range of from $1.0\times10^2$ to $5.0\times10^3$ MPa (invention 5). Due to the substrate film overall having such a storage modulus, the pressure-sensitive adhesive sheet has particularly good sticking suitability under a temperature when stuck on under ordinary conditions.

In the case of the above inventions (inventions 4 and 5), the surface-most layer of the substrate film preferably comprises a polyurethane as a main component thereof (invention 6).

EFFECTS OF THE INVENTION

According to the pressure-sensitive adhesive sheet of the present invention, even if unevenness occurs due to grit or the like when used outdoors, the evenness can be recovered, and hence a high glossiness and good appearance can be recovered.

DESCRIPTION OF THE PREFERRED EMBODIMENTS

Following is a description of embodiments of the present invention.

First Embodiment

Figure 1:
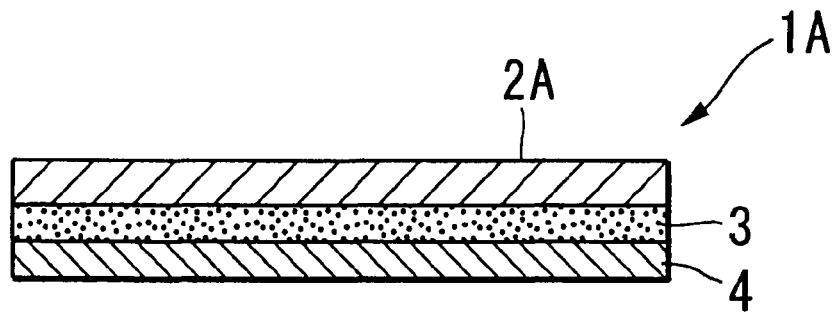
FIG. 1 is a sectional view of a pressure-sensitive adhesive sheet according to a first embodiment of the present invention.

FIG. 1 is a sectional view of a pressure-sensitive adhesive sheet 1A according to a first embodiment of the present invention. As shown in FIG. 1, the pressure-sensitive adhesive sheet 1A according to the present embodiment comprises a single-layer substrate film 2A, a pressure-sensitive adhesive layer 3, and a release liner 4 laminated on one another. Note, however, that the release liner 4 is peeled off when using the pressure-sensitive adhesive sheet 1A.

It is a prerequisite that the substrate film 2A has a specular gloss Gs (60°) of not less than 80%. In the present specification, the specular gloss Gs (60°) is the value measured in accordance with JIS K7105. Due to the specular gloss Gs (60°) being not less than 80%, the pressure-sensitive adhesive sheet 1A has a high glossiness.

The substrate film 2A must have a storage modulus at some temperature between 70° C. and 90° C. in a range of from $1.0\times10^1$ to $2.8\times10^2$ MPa, preferably from $1.5\times10^1$ to $2.5\times\times10^2$ MPa. Due to the substrate film 2A having such a storage modulus, even if the surface of the substrate film 2A happens to become uneven due to attachment or embedment of fine particles such as grit (yellow sand etc.), sand-mud, iron powder, exhaust soot or the like, by heating to a temperature within the above temperature range at which the storage modulus is as above, the substrate film 2A will become soft, and hence the uneven surface of the substrate film 2A can be recovered to its original even state, attached or embedded fine particles falling off from the substrate film 2A. The high glossiness and good appearance of the pressure-sensitive adhesive sheet 1A can thus be recovered.

Moreover, the substrate film 2A preferably has a storage modulus at from 5 to 35° C. in a range of from $1.0\times10^2$ to $5.0\times10^3$ MPa. Due to the substrate film 2A having such a storage modulus, the substrate film 2A exhibits a predetermined flexibility under a temperature when stuck on under ordinary conditions (5 to 35° C.), and hence the pressure-sensitive adhesive sheet 1A has particularly good sticking suitability. The storage modulus of the substrate film 2A at from 5 to 35° C. is particularly preferably from $1.5\times10^2$ to $3.5\times10^3$ MPa. Due to the substrate film 2A having such a storage modulus, the pressure-sensitive adhesive sheet 1A has yet better following ability along curved surface.

Moreover, the substrate film 2A preferably has a storage modulus at 50° C. in a range of from $5.0\times10^2$ to $7.0\times10^3$ MPa, particularly preferably from $6.0\times10^2$ to $4.0\times10^3$ MPa. Due to the substrate film 2A having such a storage modulus, the substrate film 2A is not prone to deforming under external force, and hence even if the pressure-sensitive adhesive sheet 1A is used outdoors, the surface of the substrate film 2A is not prone to becoming uneven due to attachment or embedment of fine particles such as grit (yellow sand etc.), sand-mud, iron powder, exhaust soot or the like. In particular, as for the pressure-sensitive adhesive sheet 1A which is used outdoors, in summer the temperature may rise to approximately 50° C., and in this case the substrate film 2A would in general become soft and thus prone to attachment of fine particles; however, because the storage modulus of the substrate film 2A is stipulated at 50° C., even in the case that the pressure-sensitive adhesive sheet 1A is placed under such a high temperature in an environment in which there are fine particles such as grit, sand-mud or iron powder, the surface of the substrate film 2A will not be prone to becoming uneven due to these fine particles.

There are no particular limitations on the material of the substrate film 2A so long as the substrate film 2A has a storage modulus as above, but a resin film is generally used.

As such a resin film, it is preferable to use, for example, a film having as a main component thereof a resin such as a polyurethane; an acrylic polymer; polyvinyl chloride; a polyolefin such as polyethylene or polypropylene; a thermoplastic elastomer of olefin type, polyester type or the like; or an ionomer; of these, a resin film having a polyurethane as a main component thereof is particularly preferable. The resin film may contain any of various additives such as inorganic fillers, organic fillers, colorants, and ultraviolet absorbers.

The thickness of the substrate film 2A is generally from 10 to 400 µm, preferably approximately from 30 to 200 µm, but can be changed as appropriate in accordance with the material of the substrate film 2A and the use of the pressure-sensitive adhesive sheet 1A.

Examples of the type of a pressure-sensitive adhesive constituting the pressure-sensitive adhesive layer 3 include an acrylic based pressure-sensitive adhesive, a polyester based pressure-sensitive adhesive, a polyurethane based pressure-sensitive adhesive, a rubber based pressure-sensitive adhesive, and a silicone based pressure-sensitive adhesive; of these, a weather-resistant acrylic based pressure-sensitive adhesive is preferable. Moreover, the pressure-sensitive adhesive may be any of an emulsion type, a solvent type, or a solvent-less type, but in the case of an acrylic based pressure-sensitive adhesive, is preferably a solvent type.

The thickness of the pressure-sensitive adhesive layer 3 is generally from 1 to 300 µm, preferably approximately from 5 to 100 µm, but may be changed as appropriate in accordance with the use of the pressure-sensitive adhesive sheet 1A.

There are no particular limitations on the material of the release liner 4; for example, a film or foamed film made of a resin such as polyethylene terephthalate, polypropylene or polyethylene, or paper such as glassine, coated paper or laminated paper that has been subjected to release treatment with a release agent such as a silicone type one, a fluorine type one or a long chain alkyl group-containing carbamate can be used.

The thickness of the release liner 4 is generally approximately from 10 to 250 µm, preferably approximately from 20 to 200 µm. In the case of punching the pressure-sensitive adhesive sheet 1A, it is preferable to use release paper of thickness from 130 to 200 µm obtained by subjecting polyethylene-laminated paper to release treatment with a silicone type release agent.

The manufacture of the pressure-sensitive adhesive sheet 1A may be carried out using an ordinary method; for example, the pressure-sensitive adhesive layer 3 is formed on the release treatment-subjected surface of the release liner 4, and then the substrate film 2A is superposed onto the surface of the pressure-sensitive adhesive layer 3. The pressure-sensitive adhesive layer 3 can be formed by preparing a coating agent containing the pressure-sensitive adhesive that will constitute the pressure-sensitive adhesive layer 3, and also a solvent if desired, applying the coating agent on to the release treatment-subjected surface of the release liner 4 using a coater such as a roll coater, a knife coater, a roll knife coater, an air knife coater, a die coater, a bar coater, a gravure coater, or a curtain coater, and drying.

Second Embodiment

Figure 2:
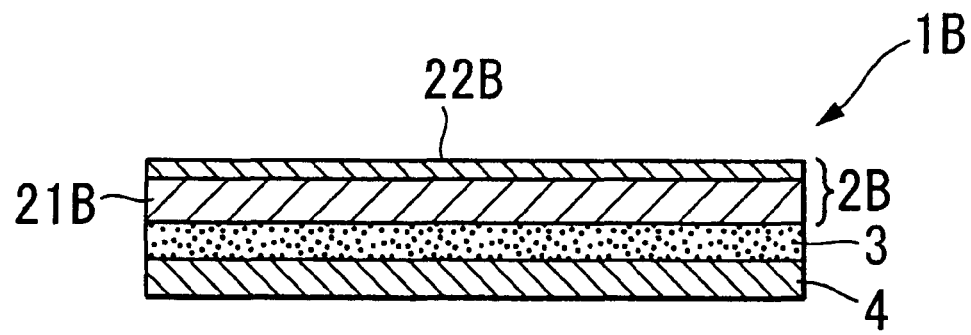
FIG. 2 is a sectional view of a pressure-sensitive adhesive sheet according to a second embodiment of the present invention.

FIG. 2 is a sectional view of a pressure-sensitive adhesive sheet 1B according to a second embodiment of the present invention. As shown in FIG. 2, the pressure-sensitive adhesive sheet 1B according to the present embodiment comprises a multi-layer substrate film 2B, a pressure-sensitive adhesive layer 3, and a release liner 4 laminated on one another. Note, however, that the release liner 4 is peeled off when using the pressure-sensitive adhesive sheet 1B.

In the present embodiment, the substrate film 2B has a two-layer structure comprising a base substrate 21B, and a coating layer 22B formed on a surface of the base substrate 21B; however, there is no limitation thereto, but rather the substrate film may alternatively have, for example, a structure comprising three or more layers.

It is a prerequisite that a surface-most layer of the substrate film 2B, i.e. the coating layer 22B has a specular gloss Gs (60°) of not less than 80%. Due to the specular gloss Gs (60°) being not less than 80%, the pressure-sensitive adhesive sheet 1B has a high glossiness.

The coating layer 22B must have a storage modulus at some temperature between 70° C. and 90° C. in a range of from $1.0\times10^1$ to $2.8\times10^2$ MPa, preferably from $1.5\times10^1$ to $2.5\times10^2$ MPa. Moreover, the thickness of the coating layer 22B is generally from 0.01 to 50 µm, preferably approximately from 0.1 to 30 µm; in the case that the storage modulus as above for the base substrate 21B is not within the same range as for the coating layer 22B, the thickness of the coating layer 22B is preferably from 0.1 to 50 µm, particularly preferably from 1 to 30 µm.

Due to the coating layer 22B having a storage modulus as above, even if the surface of the substrate film 2B happens to become uneven due to attachment or embedment of fine particles such as grit (yellows and etc.), sand-mud, iron powder, exhaust soot or the like, by heating to a temperature within the above temperature range at which the storage modulus is as above, the coating layer 22B will become soft, and hence the uneven surface of the substrate film 2B can be recovered to its original even state, attached or embedded fine particles falling off from the substrate film 2B. The high glossiness and good appearance of the pressure-sensitive adhesive sheet 1B can thus be recovered.

Moreover, the substrate film 2B overall preferably has a storage modulus at from 5 to 35° C. in a range of from $1.0\times10^2$ to $5.0\times10^3$ MPa. Due to the substrate film 2B having such a storage modulus, the substrate film 2B exhibits a predetermined flexibility under a temperature when stuck on under ordinary conditions (5 to 35° C.), and hence the pressure-sensitive adhesive sheet 1B has particularly good sticking suitability. The storage modulus of the substrate film 2B at from 5 to 35° C. is particularly preferably from $1.5\times10^2$ to $3.5\times10^3$ MPa. Due to the substrate film 2B having such a storage modulus, the pressure-sensitive adhesive sheet 1B has yet better following ability along curved surface.

Moreover, the coating layer 22B preferably has a storage modulus at 50° C. in a range of from $5.0\times10^2$ to $7.0\times10^3$ MPa, particularly preferably from $6.0\times10^2$ to $4.0\times10^3$ MPa. Due to the coating layer 22B of the substrate film 2B having such a storage modulus, the surface of the substrate film 2B is not prone to deforming under external force, and hence even if the pressure-sensitive adhesive sheet 1B is used outdoors, the surface of the substrate film 2B is not prone to becoming uneven due to attachment or embedment of fine particles such as grit (yellow sand etc.), sand-mud, iron powder, exhaust soot or the like. In particular, as for the pressure-sensitive adhesive sheet 1B which is used outdoors, in summer the temperature may rise to approximately 50° C.; however, because the storage modulus of the coating layer 22B is stipulated at 50° C., even in the case that the pressure-sensitive adhesive sheet 1B is placed under such a high temperature in an environment in which there are fine particles such as grit, sand-mud or iron powder, the surface of the substrate film 2B will not be prone to becoming uneven due to these fine particles.

Examples of the type of the coating layer 22B include a colored or decorative layer formed by a method such as printing, painting, transfer from a transfer sheet, vapor deposition, or sputtering, an undercoat layer such as an adhesion facilitating coat for forming such a decorative layer, or a gloss adjusting coat, a topcoat layer such as a hard coat, an antifouling coat, a weather-resistant coat, or a surface roughness or specular gloss adjusting coat, and an antistatic layer.

There are no particular limitations on the material constituting the coating layer 22B so long as the coating layer 22B has a storage modulus as above; it is preferable to use, for example, a film having as a main component thereof a resin such as a polyurethane; an acrylic polymer; polyvinyl chloride; a polyolefin such as polyethylene or polypropylene; a thermoplastic elastomer of olefin type, polyester type or the like; or an ionomer; of these, a resin film having a polyurethane as a main component thereof is particularly preferable. The resin may contain any of various additives such as pigments, inorganic fillers, organic fillers, and ultraviolet absorbers.

The material of the base substrate 21B is preferably one such that the substrate film 2B overall has a storage modulus as described above; for example, there can be used a film or a foamed film made of a resin such as a polyolefin such as polyethylene or polypropylene, a polyester such as polyethylene terephthalate or polybutylene terephthalate, polyvinyl chloride, polystyrene, a polyurethane, a polycarbonate, a polyamide, a polyimide, polymethyl methacrylate, polybutene, polybutadiene, polymethylpentene, an ethylene-vinyl acetate copolymer, an ethylene-(meth)acrylic acid copolymer, an ethylene-(meth)acrylate ester copolymer, an ABS resin, or an ionomer resin, or a thermoplastic elastomer containing a component such as a polyolefin, a polyurethane, polystyrene, polyvinyl chloride or a polyester, or a laminated film of the above. The resin film may contain any of various additives such as inorganic fillers, organic fillers, colorants, and ultraviolet absorbers.

The thickness of the substrate film 2B is generally from 10 to 400 µm, preferably approximately from 30 to 200 µm, but can be changed as appropriate in accordance with the materials of the base substrate 21B and the coating layer 22*b* and the use of the pressure-sensitive adhesive sheet 1B.

Regarding the pressure-sensitive adhesive layer 3 and the release liner 4, ones the same as the pressure-sensitive adhesive layer 3 and the release liner 4 of the pressure-sensitive adhesive sheet 1A according to the first embodiment described above can be used.

The manufacture of the pressure-sensitive adhesive sheet 1B may be carried out using an ordinary method; for example, the coating layer 22*b* is formed by coating or is laminated on the base substrate 21B so as to form the substrate film 2B, and the pressure-sensitive adhesive layer 3 is formed on the release treatment-subjected surface of the release liner 4, then the base substrate 21B side of the substrate film 2B is superposed onto the surface of the pressure-sensitive adhesive layer 3, or alternatively the pressure-sensitive adhesive layer 3 is formed on the release treatment-subjected surface of the release liner 4, then the base substrate 21B is superposed onto the surface of the pressure-sensitive adhesive layer 3, and then the coating layer 22*b* is formed by coating or is laminated on the base substrate 21B.

The pressure-sensitive adhesive sheet 1A or 1B described above can be used, for example, as a high-gloss blackout tape for an automobile door sash or the like, or as a high-gloss marking sheet stuck onto a signboard or an exterior portion of a vehicle such as a car, a bus, a train, or an airplane.

Note that the pressure-sensitive adhesive sheet 1A or 1B according to either of the above embodiments has the release liner 4, but there is no limitation to this in the present invention; the release liner 4 may be omitted. Furthermore, there are no particular limitations on the size, shape and soon of the pressure-sensitive adhesive sheet 1A or 1B according to either of the above embodiments. For example, the pressure-sensitive adhesive sheet 1A or 1B may be a tape comprising only the substrate film 2A or 2B and the pressure-sensitive adhesive layer 3 (a pressure-sensitive adhesive tape), and may also be rolled up into a roll.

Moreover, another layer may be provided between the substrate film 2A or 2B and the pressure-sensitive adhesive layer 3, for example a primer layer for improving the adhesion between the substrate film 2A or 2B and the pressure-sensitive adhesive layer 3, an anti-static layer, or the like.

EXAMPLES

Following is a more detailed description of the present invention through examples and so on; however, the scope of the present invention is not limited by these examples and so on.

Example 1

An acrylic acid-containing acrylic solvent type pressure-sensitive adhesive (made by Lintec Corporation, SK) was applied using a knife coater such that the thickness after drying would be 30 μm onto the release treatment-subjected surface of release liner (made by Lintec Corporation, SP-12HL, thickness: 170 μm) obtained by subjecting polyethylene-laminated paper to release treatment with a silicone type release agent, and drying was carried out for 1 minute at 90° C.

The base substrate side of a substrate film comprising a 100 μm-thick black polyurethane film (made by Seikoh Chemicals Co., Ltd., LUCKSKIN FT221P-100BK-11, specular gloss Gs (60°): 90%) having on a surface thereof a 25 μm-thick clear coating layer (made by Seikoh Chemicals Co., Ltd., LUCKSKIN FT221P-50-11) made of a non-crosslinked polyurethane was superposed onto the pressure-sensitive adhesive layer thus formed, whereby a pressure-sensitive adhesive sheet was obtained. Here, the measurement of the specular gloss Gs (60°) was carried out in accordance with JIS K7105, using a VG2000 gloss meter made by Nippon Denshoku Industries Co., Ltd. as the measurement apparatus (likewise hereinafter).

Example 2

A pressure-sensitive adhesive sheet was produced as in Example 1, except that a 100 μm-thick black polyurethane film (made by Seikoh Chemicals Co., Ltd., LUCKSKIN FT221P-100BK-8, specular gloss Gs (60°): 90%) having on a surface thereof a 25 μm-thick clear coating layer (made by Seikoh Chemicals Co., Ltd., LUCKSKIN FT221P-50-8) made of a crosslinked polyurethane was used as the substrate film.

Comparative Example 1

A pressure-sensitive adhesive sheet was produced as in Example 1, except that a 100 μm-thick black polyurethane film (made by Seikoh Chemicals Co., Ltd., LUCKSKIN FT221P-100BK-9, specular gloss Gs (60°): 90%) having on a surface thereof a 25 μm-thick clear coating layer (made by Seikoh Chemicals Co., Ltd., LUCKSKIN FT221P-50-9) made of a crosslinked polyurethane was used as the substrate film.

Test Examples (1) Measurement of Storage Modulus

Each of the substrate film and the coating layer used in each of the Examples and the Comparative Example was cut to 3 mm×30 mm, and the storage modulus was measured at each of 5° C., 20° C., 35° C., 50° C., 70° C., 80° C., and 90° C. at a frequency of 11 Hz using a dynamic viscoelasticity measuring apparatus (made by Orientec Corporation, Rheovibron DDV-II-EP) Here, the heating rate was made to be 3° C./min. The storage modulus at each of 50° C., 70° C., 80° C., and 90° C. indicates the storage modulus of the substrate film in the case of a single-layer substrate film or of the surface-most layer in the case of a multi-layer substrate film, and the storage modulus at each of 5° C., 20° C., and 35° C. indicates the storage modulus of the substrate film overall in the case of either a single-layer substrate film or a multi-layer substrate film. The results are shown in Table 1.

TABLE 1

| | Storage modulus (MPa) | | | |
|---|---|---|---|---|
| | 50° C. | 70° C. | 80° C. | 90° C. |
| Example 1 | $6.7 \times 10^2$ | $2.7 \times 10^2$ | $1.7 \times 10^2$ | $1.2 \times 10^2$ |
| Example 2 | $4.2 \times 10^2$ | $2.1 \times 10^2$ | $1.3 \times 10^2$ | $6.9 \times 10^1$ |
| Comparative Example 1 | $4.6 \times 10^2$ | $4.6 \times 10^2$ | $3.8 \times 10^2$ | $2.9 \times 10^2$ |

| | Storage modulus (MPa) | | |
|---|---|---|---|
| | 5° C. | 20° C. | 35° C. |
| Example 1 | $3.3 \times 10^2$ | $2.5 \times 10^2$ | $1.9 \times 10^2$ |
| Example 2 | $2.8 \times 10^2$ | $2.1 \times 10^2$ | $1.5 \times 10^2$ |
| Comparative Example 1 | $2.5 \times 10^2$ | $1.9 \times 10^2$ | $1.7 \times 10^2$ |

(2) Embedment Test

The pressure-sensitive adhesive sheet obtained in each of the Examples and the Comparative Example was cut to 50 mm×50 mm, and had the release liner peeled off therefrom, and was then stuck onto a melamine coated plate, thus obtaining a test panel.

2 g of a dispersion obtained by dispersing 1.0 g of 30 μm-diameter glass beads in 400 g of purified water was dripped onto the surface of the pressure-sensitive adhesive sheet on the test panel. Next, the test panel was dried by heating for 1 hour at 50° C. in an oven, and was then washed with water, and then the water was removed. The surface of the pressure-sensitive adhesive sheet subjected to this treatment was inspected with the naked eye and magnified by 300 times, evaluation being carried out as follows. The results are shown in Table 2.

◎: Depressions not seen even when magnified by 300 times
○: Depressions not seen with naked eye
X: Depressions easily seen with naked eye (3) Recoverability Test After the above embedment test had been carried out, each test panel was heated for 5 minutes at 80° C. in an oven. The surface of the pressure-sensitive adhesive sheet subjected to this treatment was evaluated as in the above embedment test. The results are shown in Table 2.

(4) Sticking Ability (Following Ability Along Curved Surface) Test

Figure 3:
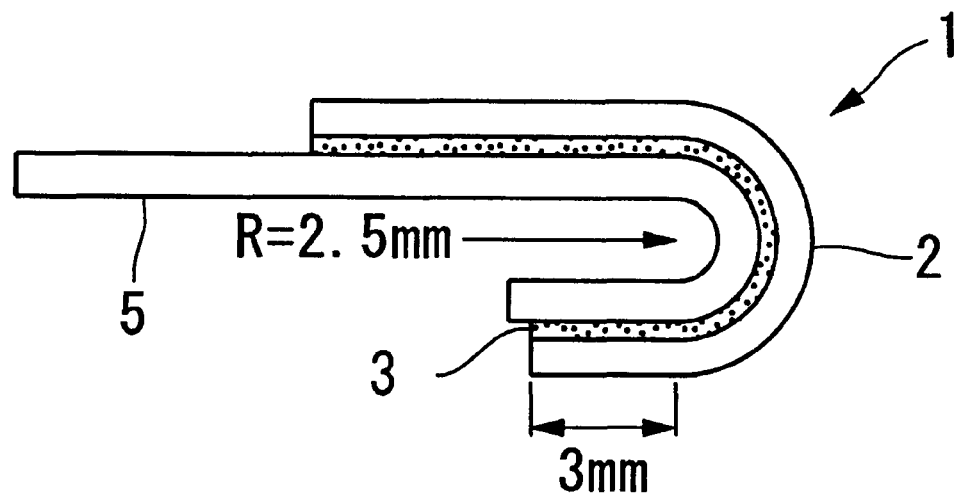
FIG. 3 is a side view of a pressure-sensitive adhesive sheet and an adherend showing a test method for an sticking ability test.

For the pressure-sensitive adhesive sheet 1 (the laminate of the substrate film 2 and the pressure-sensitive adhesive layer 3) obtained in each of the Examples and the Comparative Example, an sticking ability test was carried out as follows. A melamine coated plate of width 50 mm, length 150 mm, and thickness 0.2 mm was bent at 180 degree as shown in FIG. 3 such that R was 2.5 mm, and this was taken as an adherend 5. Under a 23° C., 50% RH environment, a piece of the pressure-sensitive adhesive sheet 1 cut to a width of 25 mm and a length of 50 mm (with the release liner peeled off) was stuck onto the adherend 5 by passing a 2 kg roller to and fro such that 3 mm of a straight portion was tucked in on a reverse side of the adherend 5 as shown in FIG. 3. It was checked whether or not there was any stretching of the pressure-sensitive adhesive sheet 1 immediately after the sticking, and it was checked whether or not there was any lifting away of the tucked in portion 24 hours after the sticking. The results are shown in Table 2.

TABLE 2

|  | Recoverability test | Embedment test | Sticking ability (following ability along curved surface) test |
|---|---|---|---|
| Example 1 | ◎ | ○ | No stretching/lifting |
| Example 2 | ○ | X | No stretching/lifting |
| Comparative Example 1 | X | X | No stretching/lifting |

As can be seen from Tables 1 and 2, for the pressure-sensitive adhesive sheets obtained in the Examples, even if unevenness occurred, the evenness could be recovered by heating.

INDUSTRIAL APPLICABILITY

The pressure-sensitive adhesive sheet of the present invention is suitable as, for example, a high-gloss pressure-sensitive adhesive sheet used outdoors, in particular a high-gloss blackout tape used on part of an automobile body.

What is claimed is:

1. A pressure-sensitive adhesive sheet comprising:
a single-layer substrate film and a pressure-sensitive adhesive layer, said substrate film having a specular gloss Gs (60°) of not less than 80%, wherein
said substrate film has a storage modulus at some temperature between 70° C. and 90° C. in a range of from $6.9 \times 10^1$ to $2.8 \times 10^2$ MPa, and
said substrate film comprises a polyurethane as a main component thereof.

2. The pressure-sensitive adhesive sheet according to claim 1, wherein said substrate film has a storage modulus at from 5 to 35° C. in a range of from $1.0 \times 10^2$ to $5.0 \times 10^3$ MPa.

3. A pressure-sensitive adhesive sheet comprising:
a multi-layer substrate film and a pressure-sensitive adhesive layer, a surface-most layer of said substrate film having a specular gloss Gs (60°) of not less than 80%, wherein
said surface-most layer of said substrate film has a storage modulus at some temperature between 70° C. and 90° C. in a range of from $6.9 \times 10^1$ to $2.8 \times 10^2$ MPa, and
said surface-most layer of said substrate film comprises a polyurethane as a main component thereof.

4. The pressure-sensitive adhesive sheet according to claim 3, wherein said substrate film overall has a storage modulus at from 5 to 35° C. in a range of from $1.0 \times 10^2$ to $5.0 \times 10^3$ MPa.

* * * * *

UNITED STATES PATENT AND TRADEMARK OFFICE
CERTIFICATE OF CORRECTION

PATENT NO. : 8,501,315 B2
APPLICATION NO. : 11/727644
DATED : August 6, 2013
INVENTOR(S) : Atsuhiro Tanaka et al.

It is certified that error appears in the above-identified patent and that said Letters Patent is hereby corrected as shown below:

Title Page

Please correct the Assignee's name in item (73) of the above-identified Letters Patent to reflect to changes below:

(73) Assignee: Lintec Corporation, Tokyo (JP)

Signed and Sealed this
Twenty-second Day of October, 2013

Teresa Stanek Rea
*Deputy Director of the United States Patent and Trademark Office*